United States Patent [19]

Bock

[11] Patent Number: 4,921,672
[45] Date of Patent: May 1, 1990

[54] METHOD FOR THE PRODUCTION OF A PROTECTIVE GLOVE

[75] Inventor: Manfred Bock, Kunzell, Fed. Rep. of Germany

[73] Assignee: Kachele-Cama Latex GmbH, Eichenzell, Fed. Rep. of Germany

[21] Appl. No.: 315,100

[22] Filed: Feb. 24, 1989

[30] Foreign Application Priority Data

Mar. 4, 1988 [DE] Fed. Rep. of Germany ....... 3807092

[51] Int. Cl.⁵ ..................... B29C 37/00; B29C 45/22; B29C 45/27
[52] U.S. Cl. ...................................... 264/161; 249/55; 2/169; 264/328.2; 264/328.8; 264/DIG. 30; 425/543; 425/806; 425/812; 425/DIG. 51
[58] Field of Search ................ 249/55, 141, 142, 144, 249/52; 264/161, 232, 238, 328.8, 328.12, 138, DIG. 30, 328.1, 328.2, 295, 328.9; 425/543, 573, DIG. 44, 813, DIG. 51, 577, 308, 812, DIG. 10, DIG. 27, 468, 467, 806; 2/168, 169

[56] References Cited

U.S. PATENT DOCUMENTS

| | | | |
|---|---|---|---|
| 1,951,377 | 3/1934 | Twiss et al. | 264/224 |
| 2,895,206 | 7/1959 | Hemphill, Jr. | 249/55 |
| 3,331,904 | 7/1967 | Friedman | 264/328.9 |
| 3,846,531 | 11/1974 | Reilly | 264/161 |
| 3,855,380 | 12/1974 | Gordon et al. | 264/161 |
| 3,865,666 | 2/1975 | Shoney | 425/577 |
| 4,126,291 | 11/1978 | Gilbert et al. | 249/141 |
| 4,750,877 | 6/1988 | McFarlane | 425/577 |

FOREIGN PATENT DOCUMENTS

| | | | |
|---|---|---|---|
| 1296335 | 5/1969 | Fed. Rep. of Germany | 425/543 |
| 2160667 | 6/1973 | Fed. Rep. of Germany | 425/573 |
| 7631476 | 1/1977 | Fed. Rep. of Germany | |
| 2050590 | 4/1971 | France | 264/161 |
| 2286702 | 4/1976 | France | 425/573 |

Primary Examiner—Jeffery Thurlow
Assistant Examiner—Mathieu Vargot
Attorney, Agent, or Firm—Wegner & Bretschneider

[57] ABSTRACT

A protective glove for the electrical industry is produced by the injection molding process by injecting plastic material into an injection mold from two opposite sides via a sprue flange. This sprue flange is cut off from the protective glove after the latter is removed from the mold.

5 Claims, 1 Drawing Sheet

METHOD FOR THE PRODUCTION OF A PROTECTIVE GLOVE

This invention relates to a method for the production of a protective glove, particularly for the electrical industry, in which plastic material is injected under high pressure into a mold having a core hand.

Protective gloves are usually produced from rubber by the dipping process. Uniform wall thicknesses can be obtained without difficulty in the dipping process. If larger wall thicknesses are required for the electrical industry in order to achieve an electrical insulation effect, then one can repeat the dipping process several times so that the wall thickness increases with each step.

If one wants to produce a protective glove by the injection molding process, then the achievement of a uniform wall thickness presents difficulties. If, for example, a protective glove is intended for the electrical industry and if the user is to be protected from voltages of up to, for example, 40 kV, then its wall thickness must not be less than a minimum dimension at any point, because electrical voltage punctures would be able to occur there. Apart from the problem of wall thicknesses having less than a minimum value, in the injection molding process it is relatively easy to form air inclusions, whereby the insulation effect is also diminished. The region of the parting line would also be critical in such protective gloves produced by the injection molding process. Accordingly, only protective gloves produced by dipping are available heretofore for the electrical industry. The problem addressed by the invention is to develop an injection molding process of the initially cited type for the production of protective gloves with which very uniform, large wall thicknesses can be obtained, so that the protective glove is usable as a safety glove for the electrical industry.

SUMMARY OF THE INVENTION

This problem is solved according to the invention in that, inside an injection mold having a core hand supported in overhung position on the side of the glove cuff, the protective glove is produced with a sprue flange connected to its glove cuff by feeding the material to the sprue flange at at least two opposite points via sprue channels and distributing it uniformly in the injection mold as far as the fingertips, and that after the crosslinking of the material and the removal of the glove from the mold the sprue flange together with its sprues is cut off from the protective glove.

Because according to the invention a sprue flange is disposed on the protective glove and the injection is performed on two opposite sides, the plastic material is distributed very uniformly in the mold without having to displace the core hand to one side, which would result in varying wall thicknesses. Since the sprue channels are disposed only at the sprue flange and never in the region of the later protective glove, the uniform structure of the protective glove is not interrupted by such sprue channels.

A special advantage of the injection molding method compared to the dipping process lies in the fact that the material need not be dissolved in solvents. The injection molding process is more environmentally compatible, because solid rubber is processed in it.

The method according to the invention can be implemented at especially low cost if an injection mold consisting of two mold halves is used and if these mold halves are each moved over the core hand from one side to close the injection mold.

Air inclusions can be easily avoided in that in the injection mold there are disposed sprue channels leading to the fingertips, via which during the injection to the fingertips the air displaced to them is exhausted.

In parts produced by the injection molding process one necessarily discerns the parting-line region of the injection mold. That can be avoided very easily in a protective glove in that the protective glove is turned inside out after removal from the mold.

BRIEF DESCRIPTION OF THE DRAWINGS

For further explanation of the process according to the invention, an injection mold is illustrated in the drawing and explained in the following.

DESCRIPTION OF PREFERRED EMBODIMENTS

Figure 1:
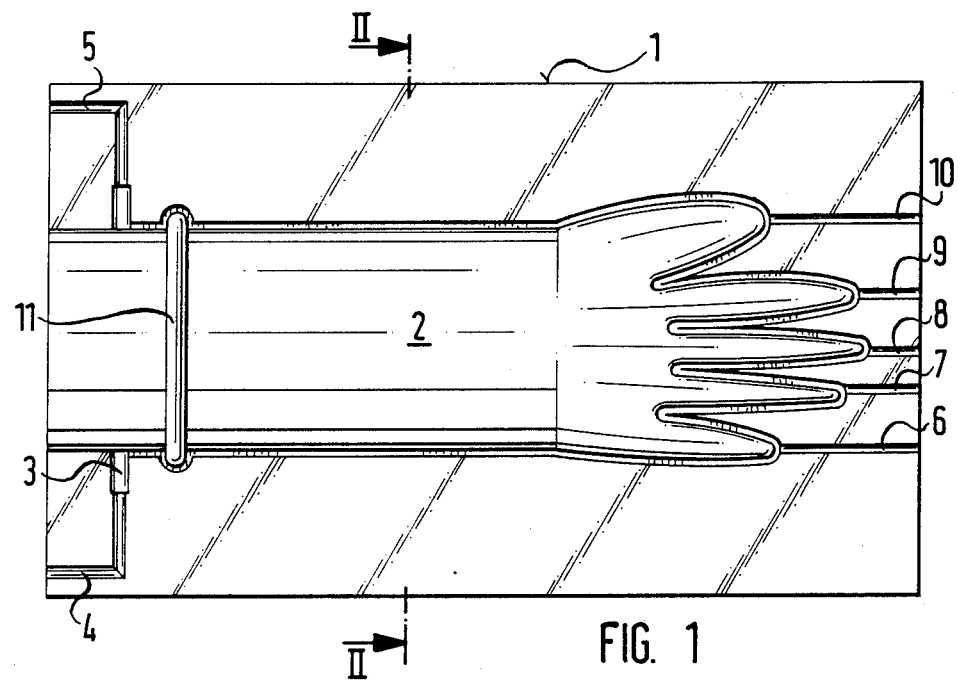
FIG. 1 is a plan view of a mold half showing the core hand.

FIG. 1 shows a mold half 1 of an injection mold in which a core hand 2 is inserted. This core hand 2 as seen in the drawing is supported in overhung position on the left side only, i.e., connected to the glove cuff. The mold half 1 surrounds the core hand 2 with a small spacing. Molded in it on the arm end of the glove is a sprue flange 3 to which sprue channels 4, 5 lead from the top and bottom. The plastic material is injected into the injection mold via these sprue channels 4, 5. In order to be able to carry away the displaced air, exhaust channels 6–10 open into the hollow space between the injection mold and the core hand 2 in the region of the fingertips.

After the injection of a protective glove, the sprue flange 3 is cut off behind a circumferential bead 11 serving as a rolled rim, so that no sprues are left on the protective glove. By turning the protective glove inside out, one can achieve the result that it is completely smooth on the outside and no parting line can be seen.

Figure 2:
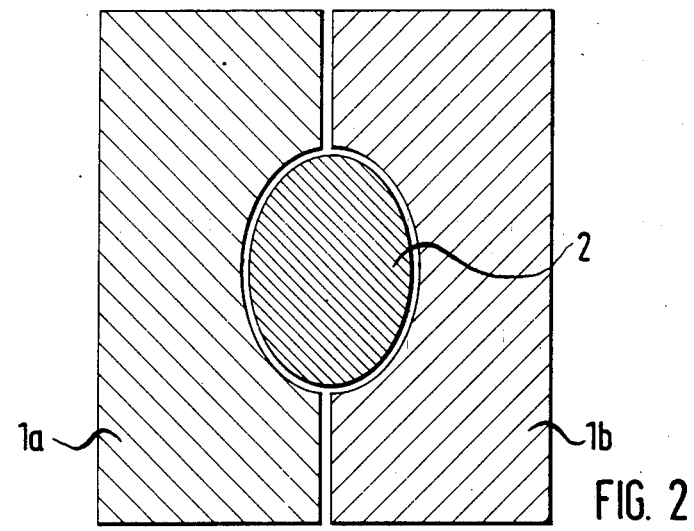
FIG. 2 is a cross-sectional view taken along the line II—II in FIG. 1.

The sectional illustration in FIG. 2 makes clear that the injection mold consists of two mold halves 1a, 1b which grip over the core hand from the sides and are moved apart to the sides for the unmolding.

I claim:

1. A method for the production of a protective glove, in which plastic material is injected under high pressure into a mold having a core hand, comprising providing an injection mold including a core hand having a glove cuff at a first end and fingertips at an opposite end supported therein in overhung position on the first end and a sprue flange connected to the glove cuff, feeding the material to the sprue flange at at least two opposite points via sprue channels and distributing the material uniformly in the injection mold as far as the fingertips, and cutting the sprue flange from the protective glove.

2. A method according to claim wherein an injection mold consisting of two mold halves is used, further comprising moving the mold halves over the core hand from one side to close the injection mold.

3. A method according to claim 1, wherein in the injection mold there are disposed sprue channels leading to the fingertips, through which during the injection to the fingertips the air displaced to the fingertips is exhausted.

4. A method according to claim 1, wherein the protective glove is turned inside out after removal from the mold.

5. A method according to claim 1, wherein the material is cured and the glove is removed from the mold prior to cutting the sprue flange from the glove.

* * * * *